United States Patent
Allanic et al.

(10) Patent No.: US 6,764,636 B1
(45) Date of Patent: Jul. 20, 2004

(54) FAST THREE-DIMENSIONAL MODELING METHOD AND DEVICE

(75) Inventors: Andre-Luc Allanic, Nancy (FR); Philippe Schaeffer, Atton (FR)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/914,712

(22) PCT Filed: Feb. 29, 2000

(86) PCT No.: PCT/FR00/00493

§ 371 (c)(1),
(2), (4) Date: Aug. 31, 2001

(87) PCT Pub. No.: WO00/51809

PCT Pub. Date: Sep. 8, 2000

(30) Foreign Application Priority Data

Mar. 1, 1999 (FR) .............................. 99 02719

(51) Int. Cl.[7] ........................... B05C 11/04; B05D 3/12; B29C 35/08; B29C 41/02
(52) U.S. Cl. ....................... 264/401; 118/100; 118/120; 264/308; 425/174.4; 425/196; 425/375; 427/356
(58) Field of Search ................................ 264/308, 401; 425/174.4, 196, 375; 427/355, 356; 118/100, 120

(56) References Cited

U.S. PATENT DOCUMENTS 5,474,719 A  12/1995  Fan et al. .................... 264/401
5,902,537 A   5/1999  Almquist et al. ............ 264/401
6,017,973 A   1/2000  Tamura et al. ........... 264/401 X

FOREIGN PATENT DOCUMENTS

| EP | 450 762 A1 | 10/1991 |
| EP | 484 182 A1 | 5/1992 |
| EP | 0499485 A2 * | 8/1992 |
| EP | 287 657 B1 | 12/1994 |
| EP | 361 847 B1 | 11/1995 |
| EP | 0807853 A2 * | 11/1997 |
| JP | 6-55643 A | 3/1994 |
| JP | 8-290475 A | 11/1996 |
| WO | WO-9623647 A2 * | 8/1996 |

* cited by examiner

Primary Examiner—Leo B. Tentoni
(74) Attorney, Agent, or Firm—Ralph D'Alessandro

(57) ABSTRACT

The invention concerns a fast three-dimensional modeling method comprising the following steps: a phase which consists in transforming the raw material in the work space (32) by means of a device inducing transformation (1); at least at one moment, a phase which consists in supplying non-transformed material, downstream of the doctor blade; a phase which consists in covering the transformed material (PI) with non-transformed material (MAT), which consists in moving the blade in a direction (F), driving in rotation about an axis a rolling member (26, 27) whereon an extruded log of non-transformed raw material (28) is wound, arranging a pushing member (22) such that its proximal edge (23) coincides with the surface of said work space, and positioning said rolling member downstream of the pushing member, and opposite thereof, so as to channel the extruded log of non-tramsformed material towards a cavity formed between the proximal edge and the rolling member facing it.

33 Claims, 3 Drawing Sheets

3A

3B

3C

FAST THREE-DIMENSIONAL MODELING METHOD AND DEVICE

BACKGROUND OF THE INVENTION

1. Field of the Invention

The present invention relates to a manufacturing technique for three-dimensional parts based on computer data representing their shape, and a device embodying this technique. Creating parts by the transformation of successive volumes (generally thin layers) of a raw material in an initial and secondary state by means of a device inducing said transformation, through the repetition of a cycle specifically involving a transformation phase of the material in at least one part of the working field performed by the device inducing the transformation, and a coating phase of the transformed material by the material which is not yet transformed, is known art.

2. Description of the Prior Art

Most of the so-called "Rapid Prototyping" machines employ this type of technique, in particular stereolithography machines, which use a photosensitive liquid raw material (which may be polymerized or reticulated) combined with a lighting device (using ultraviolet laser scanning, for example), and the so-called powder sintering machines, using a raw material in the form of a powder, which may be locally sintered by thermal means (infrared laser scanning, for example).

Numerous patent applications have been filed in relation to this type of machine, in particular in the field of stereolithography. A complete description of the technique is provided in document EP 0361847, and similar techniques are also described in documents EP 0450762 and EP 0484182. In document EP 0287657 a detailed description is provided of a powder sintering technique, as well as a description of the device for the implementation of the technique.

One feature common to the stereolithography and powder sintering techniques is that they require the implementation of means to spread the raw material in the form of thin layers (to perform the coating phase), automatically, rapidly and homogeneously. In general, the coating phase consists in sweeping the surface of the working field with the aid of at least one elongated device called a recoater blade, which is placed in movement over the working field. Depending on the case, the recoater blade transports the material used for the coating, or simply levels off a previous deposit of material.

Numerous devices have been designed to embody the recoater blade. For example, in the field of powders, in document EP 0287657, there is a description of a recoater blade composed of a dynamic roller which rotates around it axis, and is placed in parallel to the working field; the lower part of the roller has the same elevation as the working field. This roller also travels carrying a volume of material located upstream and gradually spreads a new layer of material downstream, thus coating the previously transformed material.

With respect to liquid raw materials, two types of techniques can be distinguished: the specific coating process is ensured in advance on the working field by coating media (chute, spray, immersion, etc.), and the recoater blade simply levels the free surface of the liquid by means of a horizontal sweeping movement, or the recoater blade performs the coating and leveling functions simultaneously. The second mode of operation involved the transport by the recoater blade (or by associated attached media) of a volume of material sufficient to coat the zones, which have just been solidified.

Various devices have been designed for the creation of the recoater blade, for example, a simple rigid blade (cf. Document EP 0361847), whose cross-section may have a specific shape, or the association of two rigid elements (document EP 0484182), which are attached to brush elements laid out in staggered rows. These initial devices have not been completely satisfying.

In fact, when using a so-called "simple recoater blade," such as, for example, a blade (or any other more or less flexible equivalent), whose lower part comes in contact with the free surface of a liquid, in parallel to said free surface, stress is generated in the area of contact between the blade and the liquid. This local shear stress is transmitted to the liquid located below the free surface, at a depth much greater than the thickness of the placed layer.

In the case of the resins traditionally used in stereolithography, whose behavior is similar to that of a Newtonian liquid, with viscosities of several thousand centipoises, the recoater blade may generate movement in the liquid at a depth which may range from several millimeters to several centimeters.

The portions of solid or semi-solid material transformed during the preceding cycles represent obstacles to the liquid in movement, which translate into strong variations of the liquid's flow condition. Therefore, near the edges of the section being produced, flatness defects appear in the layer that was just spread by the recoater blade. A schematic illustration of these faults is provided in document WO 95/15842, where meniscuses (concave or convex) are depicted near the liquid-solid transition areas.

These meniscuses cause geometric faults on the parts created, and, once solidified, represent an additional impediment for the placement of the following layer, which finally, translates into an amplification of defects, incompatible with the coating device (risk of pulling up the layers, material accidents, etc.).

In order to limit these problems, it is sometimes possible to slow the speed of movement of the recoater blade, or impose a setting period prior to proceeding with the following transformation phase, but these solutions result in a substantial increase in part manufacturing time, leading to increased production costs, which may be prohibitive.

The solution proposed in document WO 95/15842, does not call into question the use of so-called "simple recoater blade," but rather consists in creating a covering structure which closely follows the shape of the parts and has the effect of distancing the meniscus problems from the areas of said parts. This clever technique allows for the use of a "simple recoater blade" composed of a thin, elongated, flexible part, and allows for very short time frames for the coating phases. The provision of the material necessary for the coating phase takes place by the transport of a type of wave of material, formed at the start of the recoater blade's movement. The volume of material included in said wave is progressively consumed by the effect of the combination of gravity and movement.

Another solution, described in document WO 96/23647 consists in using a so-called "active recoater blade," in this case, a dynamic roller which moves in a "counter-rotation" direction, associated with a type of barrier, composed of a rectilinear blade, whose lower side is located a short distance from the upper part of the roller. A roller turning in a "counter-rotation" direction is such that any point located on its periphery when it passes the point of its trajectory closest to the working field, has a relative tangential speed with respect to the axis of rotation moving in the same direction as the speed of movement of the rotational axis of the roller with respect to the working field.

The operation of this device is illustrated in the figures attached to this document, for the case in which a prior deposit of material has take place downstream. The barrier forms an obstacle to the free circulation of the liquid located downstream of the roller, allowing for the regulation of the thickness of the film formed on the upstream portion of the roller. The film's free surface meets that of the layer formed upstream, thus forming a sharp lap-back point in proximity to the lower portion of the roller. This lap-back point defines the height of the free surface of the material placed upstream, and since it is constantly fixed with respect to the roller axis, the layer may be leveled.

A detailed analysis of the physical phenomena involved is proposed in the document in order to explain the advantages of such a device with respect to a single blade (simple recoater blade), in particular with respect to the interactions with the liquid located near the recoater blade. In particular, it appears that the "counter-rotation" direction of the roller's rotation strongly attenuates such interaction, while on the other hand, a movement in the non "counter-rotation" direction, which will be called the "rolling direction" hereinafter, would induce effects of pressure resulting in the placement of a non-homogenous layer.

Different variations are proposed, in particular concerning the cross-section of said barrier and its orientation. Other variations aiming at remedying the undesirable effects of the potential accumulation of material near the blade are addressed: using an endless screw removal device, or a blade with a channeling system. Finally, two feed methods are proposed for the device: either the layer of material is deposited downstream in advance, and the recoater blade simply corrects the residual flatness defects, or the recoater blade transports a volume of liquid sufficient to provide the quantity of material necessary for the coating (as in the solution of document WO 95/15842).

These exists a range of materials which are of particular interest for Rapid Prototyping, in particular those allowing a way around the primary defect of powders (the creation of porous parts) and of acrylic or epoxy liquid resins (low mechanical strength, fragility, etc.): highly viscous, even pasty materials. These materials may be obtained, for example, by the addition of a high volumetric rate of sediment load (powder), to a bonding agent composed of photosensitive or thermosetting liquid resin. Hereinafter, pastes will be qualified as the category of materials including materials of a very high viscosity (greater than 10,000 centipoises), or "marked threshold" materials. A "threshold" material is one that does not flow (no gradient) such that the shear stress applied to it does not go beyond a minimum value. A material will be considered as having a "marked threshold" when the value of this shear stress is greater than 20 Newtons per square meter.

The known solutions for performing the coating phase are not appropriate for pastes, primarily due to their relative "insensitivity" to the effect of gravity.

In fact, first, the materials just transformed by a layer of paste must be coated, which is practically impossible by means of a simple immersion technique. The solution traditionally adopted, consisting of transporting a volume of material with a scraper, placed in movement in parallel to the working field, and progressively depositing this volume of material, located downstream of the scraper, over the lower layers, is relatively difficult to implement with pastes. In order for the spreading to take place, it is indispensable for the volume of material located downstaeam of the scraper, near the lower edge thereof, to come in contact with the free surface of the lower layers. In fact, the volume of material is thus subjected to a strong speed gradient (speed of movement of the recoater blade for the part in contact with the scraper, and no speed whatsoever for the part in contact with the lower layers), generating the shear stress required to obtain the indispensable flow of material upstream. As long as gravity ensures a descending flow of the volume of material located downstream, with sufficient speed to offset the flow of material consumed by the spreading, this indispensable contact may be maintained. However, if the contact is broken, the volume of material upstream is simply transported, without being spread. Now, with pastes, the flow induced by the effect of gravity on the volume downstream of the scraper is very weak (given the high viscosity), and may even by nonexistent if its flow threshold is sufficiently high. Consequently, even if a volume of material is provided downstream of the scraper from the start, which is theoretically sufficient to ensure the desired coating, there is still the risk of "detachment," or coating defects (formation of "holes" in the deposited layer), which are incompatible with the manufacturing technique.

Of course, in order to skirt the problem one could consider performing a prior deposit of material, which the scraper would simply play a leveling role. However, it is not easy to perform such a prior deposit. In fact, transfer means adapted to pasty materials would have to be used (special pumps), in order to ensure their placement over the working field, thus leading to additional costs and complexity, especially if we wish to maintain strict control of the delivery of the material. In addition, so as not to risk "detachment" a continuous excess of material would have to be supplied downstream. Now, this would imply a progressive accumulation of material on the scraper during its path over the working field, and thus the need to implement means to eliminate the volume thus accumulated.

The technique embodied by the invention allows for the resolution of these problems.

BRIEF SUMMARY OF THE INVENTION

The present invention provides its benefits across a broad spectrum. While the description which follows hereinafter is meant to be representative of a number of such application, it is not exhaustive. As will be understood, the basic methods and apparatus taught herein can be readily adapter to many uses. It is intended that this specification and the claims appended hereto be accorded a breadth in keeping with the scope and spirit of the invention being disclosed despite what might appear to be limiting language imposed by the requirements of referring to the specific examples disclosed.

In order to simplify the following description, we have chosen to implicitly address the specific case in which the working field is horizontal (allowing for the use of expressions such as "over," "the lower edge," etc.). This rhetorical choice should not be interpreted as limiting the scope of the invention, to the extent that with pastes, the technique embodied by the invention may operate with a non-horizontal working field, and even with a working field presenting a curved surface.

In accordance with one embodiment of the invention, during at least one of the coating phases, said coating phase employs at least one recoater blade placed in movement to perform the various coating phases. Said recoater blade is composed of at least one elongated element called the pusher, whose lower edge covers a surface coinciding with the surface of the working field during the trajectory of the recoater blade over the working field. A type of extruded log of raw material, that is an elongated volume of raw material is formed and placed against the lower edge of the pusher, downstream, with the lower portion of the log being located in proximity to the surface of the working field, and the extruded log of raw material is placed in rotation around its own axis, by means of at least one device called a roller, located downstream of the pusher, with said roller being placed in rotation around an axis in parallel to the recoater blade.

Thus, a rapid recycling of the raw material near the lower edge and downstream of the pusher is ensured, allowing for the resolution of the problem of "detachment" referenced above, and the extruded log is transported by the pusher over the surface of the working field.

As an advantage, in accordance with the invention, said extruded log of raw material is placed in rotation in the "rolling direction." In fact, this direction of rotation allows the material composing the lower portion of the extruded log to move with a speed component opposite that imposed by the movement of the pusher, which contributes to limiting the interaction with the lower layers and thus limiting the scope of the resulting defects (meniscuses).

In accordance with the invention, the extruded log of raw material formed downstream of the pusher may be transported by a non-sliding rolling movement over the working field, by adapting the speed of rotation specific to the raw material to the speed of movement of the pusher. This specific method of transporting the raw materials ensures a relative speed of virtually zero for the material located in the lower portion of the extruded log, with respect to that of the lower layers, which it comes in contact with said lower layers, which contributes strongly to a "gentle" placement, as if a film of paste were rolled onto the lower layers. It is sufficient for the portion of material located near the exterior surface of said extruded log to maintain this non-sliding rolling movement in order to obtain the desired effect (potential internal movements of the material within the log, which do not conform to the non-sliding rolling conditions, are acceptable). Pastes obtained by the addition of a sediment load into a liquid bonding agent are generally opaque, and only the exterior surface of the material log is visible. For this reason, in order to obtain the desired beneficial effect, it is considered that the material log should be transported with an "apparent" non-sliding rolling movement.

In accordance with the invention, in order to supply the recoater blade with the raw material necessary for the coating, we proceed as follows: along the recoater blade's trajectory, through a feed mechanism, at least one volume of raw material is formed whose upper portion extends above the surface defined by the lower edge of the pusher when the recoater blade is in motion, in such a way that, during its trajectory, the recoater blade levels off said extended portion of raw material and transports it in the direction of the working field to coat the previously transformed material. This feed method allows, in particular, for the movement of the feed zone outside of the working field, and avoids the implementation of mobile feed methods. As a variation, a continuous feed of non-transformed, raw material can also be envisioned.

It is advantageous to use raw materials which, in their initial state, are pasty materials presenting a marked flow threshold. In fact, with such materials, the depth at which movements are caused in the lower layers is limited, since these movements can only take place at a level of minimal stress (the flow threshold). Now, the lower said depth is, the less the risk of the appearance of meniscuses.

In a variation of the invention, the reversal of the direction of movement of the recoater blade takes place at least once to perform two successive coating phases (whether separated or not by a transformation phase). This method allows us to avoid the recoater blade traveling over a recycling path, which would be necessary if the coating phase were always performed in the same direction. Within the framework of this variation of the invention, its is advantageous to form the log of raw material between two pushers laid out in parallel (at least one roller being placed in the space between the two pushers), in such a way that, at the time the movement of the recoater blade is reversed, there is always an extruded log downstream of a pusher. In fact, as described in the commentary on FIG. 3, the log may be detached from the pusher with which it was in contact, and be recovered by the second pusher after the movement is reversed. Thus, it is possible to resolve the need to provide material prior to each coating phase.

In accordance with the invention, the two pushers may be independent or linked by a single piece structure with an inverted U or other shape.

It is not necessary to have more than one roller, since given that it is placed between the two pushers, it may be used in alternation with one or the other, potentially by adapting its direction of rotation to the direction of movement. As illustrated in FIG. 3, it may be advantageous for the implementation of this variation of the technique in accordance with the invention, to create a recoater blade comprised of at least two pushers connected to a common chassis, with said chassis being linked to the recoater blade's control and direct mechanism by means of a pivot hinge.

As an advantage, an appreciable elevation of the pusher, located downstream (in the direction of movement of the recoater blade) in ensured, with respect to the surface of the working field, so that it is not loaded with raw material, during its passage over the working field, which it levels off the potential meniscuses created during the preceding coating phase. After the reversal of the recoater blade's direction of movement, the raw material thus accumulated on the pusher runs the risk of being placed haphazardly on the working field, which would lead to the placement of an irregular layer.

The device embodied by the invention may be comprised as follows:

of means to induce the transformation of the raw material on a working field.

of means to perform the coating phases using at least one recoater blade comprised of at least one pusher, said pusher being comprised of a mechanical element, elongated in shape, whose lower edge defines a surface which coincides with the surface of the working field during the trajectory of the recoater blade over the working field, and at least one roller, comprised of a mechanical element, elongated in shape, placed in parallel to the pusher, downstream of said pusher, and placed in rotation by a drive mechanism around an axis parallel to the pusher, with said recoater blade(s) placed in movement in parallel to the working field through coating phases undertaken by means of control and drive mechanisms.

of means to move the volumes already transformed with respect to the working field.

potentially, a container to hold the material.

of means to control the various elements of the device.

of a raw material feed mechanism.

In order to easily obtain the formation of an extruded log of raw material, rolling on its own axis near the lower edge of the pusher and downstream of said pusher, it is of interest to place the roller, with respect to the pusher, in such a fashion that it ensures the existence of a sufficiently large space between the surface of the previously placed layer and the lower portion of said roller. In fact, such a space allows the material located downstream of the pusher, near the lower edge of the roller, to circulate along the circular path imposed by the movement of the roller, without being "stopped" or deviated from its trajectory, by the fixed material in the lower layers (in particular, the transformed portions) with which it comes in contact. This local looping flow around the axis of the roller, downstream of the pusher, allows for the initiation of the desired formation of the material log, and when its is complete, the maintenance of its rotating movement. It can be confirmed that with a space at least equal in height to the thickness of the layer to be placed, the formation of the log and its rotation are simple to obtain with pastes of limited thickness; for thicker pastes, it is preferable to have a space significantly greater than the thickness of the layer being placed. In order to determine this minimum height of the space (thickness of the layer being placed), it is sufficient to place the axis of rotation of the roller at a height greater than that of the lower edge of the pusher, the difference in height between the roller's rotational axis and the lower edge of the pusher being at least equal to the value of the largest radius of the circles described by the material points of the roller during its rotating movement.

The device embodying the technique in accordance with the invention may be such that the roller's rotational axis is determined in relation to the lower edge of the pusher, downstream of said pusher, at a height greater than or equal to the largest radius of the circles described by the material points of the roller during its rotating movement.

As an advantage, the roller's direction of rotation is in the "rolling direction," which allows it to provide the material log being transported a direction of rotation in the "rolling direction."

It is of interest to choose a pusher whose side facing the roller presents a protuberance in. parallel to the lower edge of the pusher, with said protuberance presenting a marked angular portion. In fact, this creates a type of cavity in the lower portion of the pusher, which, combined with the action of the roller and the movement of the pusher, contributes to the channeling of the material transported by the recoater blade in the form of the rolling log. It is also of interest to be able to easily adjust the height of said protuberance, for example with the help of a plated part added to the downstream side of the pusher, as illustrated in the attached FIG. 2. In fact, it has been confirmed that this parameter (height of the protuberance) allows for the optimization of the coating quality performed as a function of the Theological characteristics of the treated material. Consequently, with such a "geometrically variable" pusher, optimal treatment can be provided for a wide variety of the pastes, by a simple mechanical adjustment, rather than having to change the pusher with each change of material.

It is advantageous to choose a pusher that presents a tapered lower edge. In fact, it has been confirmed that the very thick pastes, the quality of the layers was significantly improved by the implementation of a pusher with a relatively sharp lower edge. It is of interest for this sort of cutting tool, to experiment with the cutting and clearance angles in order to optimize it for the specific characteristics of each material. With pastes, it is often difficult to ensure a perfect homogeneity of the material, which may restrict the technique. For example, in the case where air bubbles are caught in the paste during mixing, this may lead to the appearance of "holes" after the material is spread. In order to resolve this problem, it is of interest to have the recoater blade cover a certain start-up path outside the working field, but near its border. In fact, during this start-up path, prior to entering into continuous operation, the recoater blade in accordance with the invention blends the material located downstream of it and this blending has the effect, on the one hand, of homogenizing the material initially delivered, and on the other, of shaping the materials so it obtains the desired log form.

In the event that large surfaces are to be coated, with a significant thickness of material, a large volume of material must be provided form the start, which makes the initial blending operation more difficult. In addition, the volume of material progressively diminishes during the coating operation, which may, in certain cases, require a progressive adaptation of the operating parameters. Such an adaptation may be easily undertaken with respect to the rotation speed of the roller and the speed of movement of the recoater blade, but providing the means to progressively change the geometric parameters of the recoater blade configuration during the recoating is much more delicate.

The addition of a second dynamic roller with independent rotation allows for the improvement of the operation of the recoater blade in accordance with the invention. In fact, with a recoater blade comprised of a pusher and at least two rollers, a more efficient blending may be obtained than with a single roller, and the effects linked to the evolution of the volume of transported material can also be attenuated. In fact, the volume of the material in circulation near the roller closest to the lower edge of the pusher changes little. This change is transferred to the second roller, which, since it is farther away from the lower edge of the pusher, has little impact on the coating operation.

When the volume of transported material is significant, it is not easy to channel the flow of material with a single roller, especially if a movement of the log approaching a non-sliding rolling movement over the working field is desired. This is why it is advantageous for the embodiment of the recoater blade, to use at least two rollers, which have rotational movement in the "rolling direction."

For the embodiment of the recoater blade in accordance with the invention, numerous variations may be implemented: the geometric form of the cross-section of the pusher may or may not be constant along the pusher, the roller may be selected in the family of prismatic bars with circular, square or triangular cross-sections, the number of rollers may also be greater than two, several recoater blades may be associated to perform simultaneous passes (initial shaping or finishing, for example) over the same area, etc.

BRIEF DESCRIPTION OF THE DRAWINGS

To provide a better understanding of the object of the invention, several embodiments depicted in the attached drawings will be described as illustrative examples, without limitation. On these drawings.

DETAILED DESCRIPTION OF THE PREFERRED EMBODIMENTS

Figure 1:
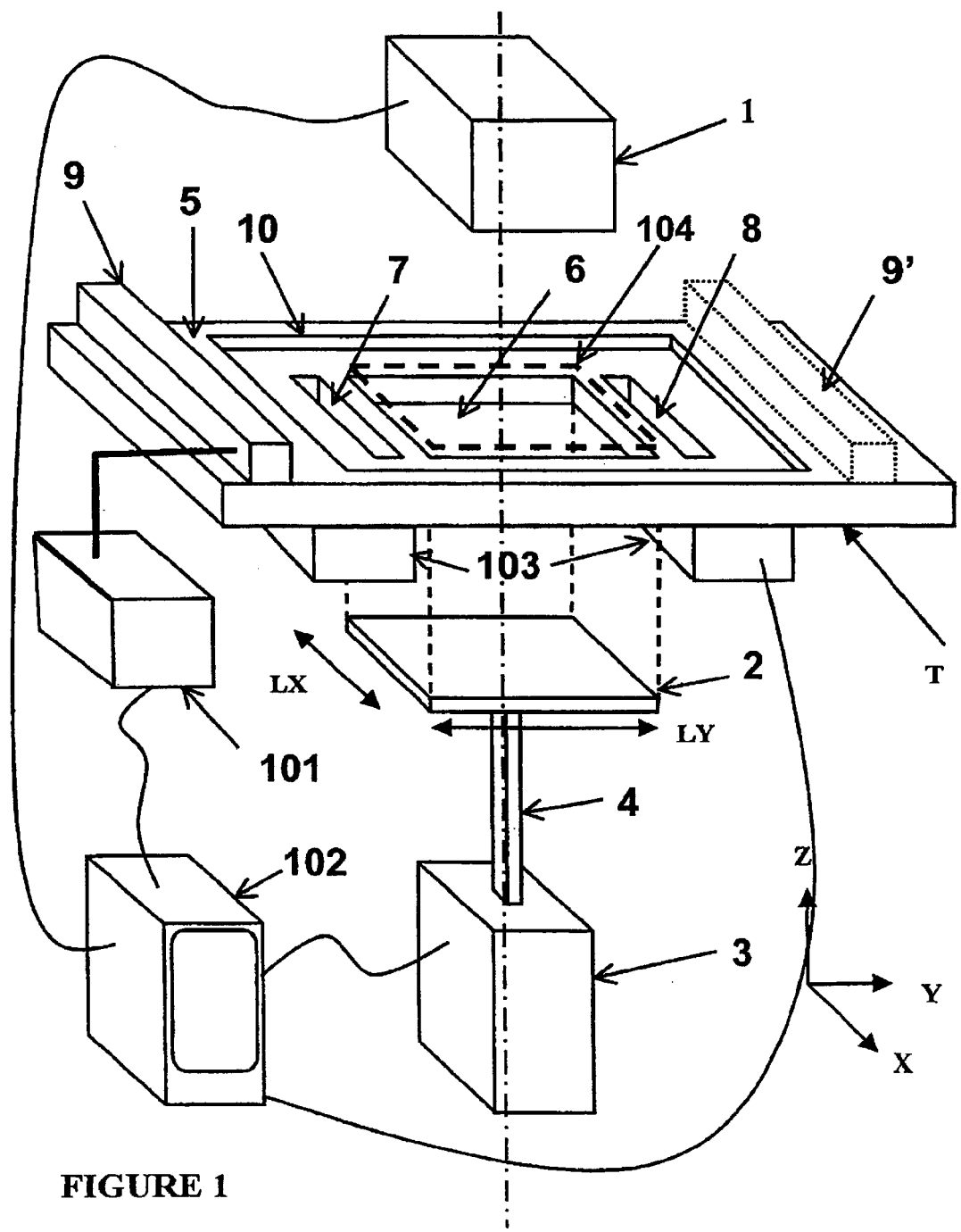
FIG. 1 shows a partial perspective view of a device for the embodiment of the technique in accordance with the invention.

FIG. 1 shows a perspective of a device for the embodiment of the technique in accordance with the invention. A device to induce transformations 1 in a working field 104, is laid out over the center of a frame 2 comprised of a rectangular part (with dimensions of LX along the X-axis and LY along the Y-axis) whose upper side is flat, with the flame being linked to a control and drive mechanism 3 through a connector 4. A table T whose upper side 5 is flat and horizontal, with a rectangular opening 6 with dimensions greater than LX along the X-axis and greater than LY along the Y-axis, is laid out in such a way that, when it moves, the frame 2 can pass through said opening 6. Two other elongated openings (7, 8), with lengths approximately equal to LX, laid out in parallel to the X-axis, a short distance from the edge of the opening 6, also fall within said table T. An elongated recoater blade 9, linked to the control and drive mechanism 101 to be moved along a horizontal path along the Y-axis, may move from an initial position (the position indicated by the solid line) to a final position (9': the position of the recoater blade indicated by the dotted line). Material feeder mechanisms 103, comprised, for example, of plungers initially filled with materials, or a pump device, are linked to the openings 7 and 8 in order to allow for the deposit of material, in the upward direction Z, through said openings 7 and 8. Openings 6, 7 and 8 are located in a low-lying area, define by contour 10, in which the upper side of the table is flat and horizontal, but whose height is slightly lower than that of side 5.

The control mechanism 102, linked to elements 1, 3, 101 and 103 allow for the control of the device.

Initially, the frame 2 is driven to a position such that the upper side coincides with the upper side of table T. The material is distributed through openings 7 and 8 and the recoater blade 9 undertakes a back and forth movement between its two end positions, so that the space covered in the low-lying area is progressively filled in with material, the free surface of the material coinciding with the place of side 5, and the upper side of the frame 2 being coated with a thin layer of material. At this stage the manufacturing cycle may start: an initial transformation phase is performed with the help of the device 1, such that the transformed portions adhere to the frame 2, then the frame 2 is moved downward, at a distance corresponding to the thickness of the desired layer. It is assumed that the recoater blade is located in position 9, the material is distributed by opening 7, then the recoater blade moves to position 9', performing the desired coating. Another transformation phase may then be performed, then, after the descent of the frame 2, the feeding of material through opening 8, and the return of the recoater blade to the initial position 9, it is ready to perform another transformation phase. The cycle may be undertaken in this fashion as many times as necessary to stack a sufficient number of layers for the complete creation of the part. At the end of manufacturing, the frame is coated with a type of parallelepiped of material, formed by the stacking of layers, and the part is included in this volume of material. The frame is then disengaged downward, for post-processing operations on the part (elimination of recovery of the material surrounding the part, cleaning, finishing, etc.).

The succession of operations is controlled by the computer control mechanism (102) linked to the various elements of the machine (1, 3, 101, 103).

Figure 2:
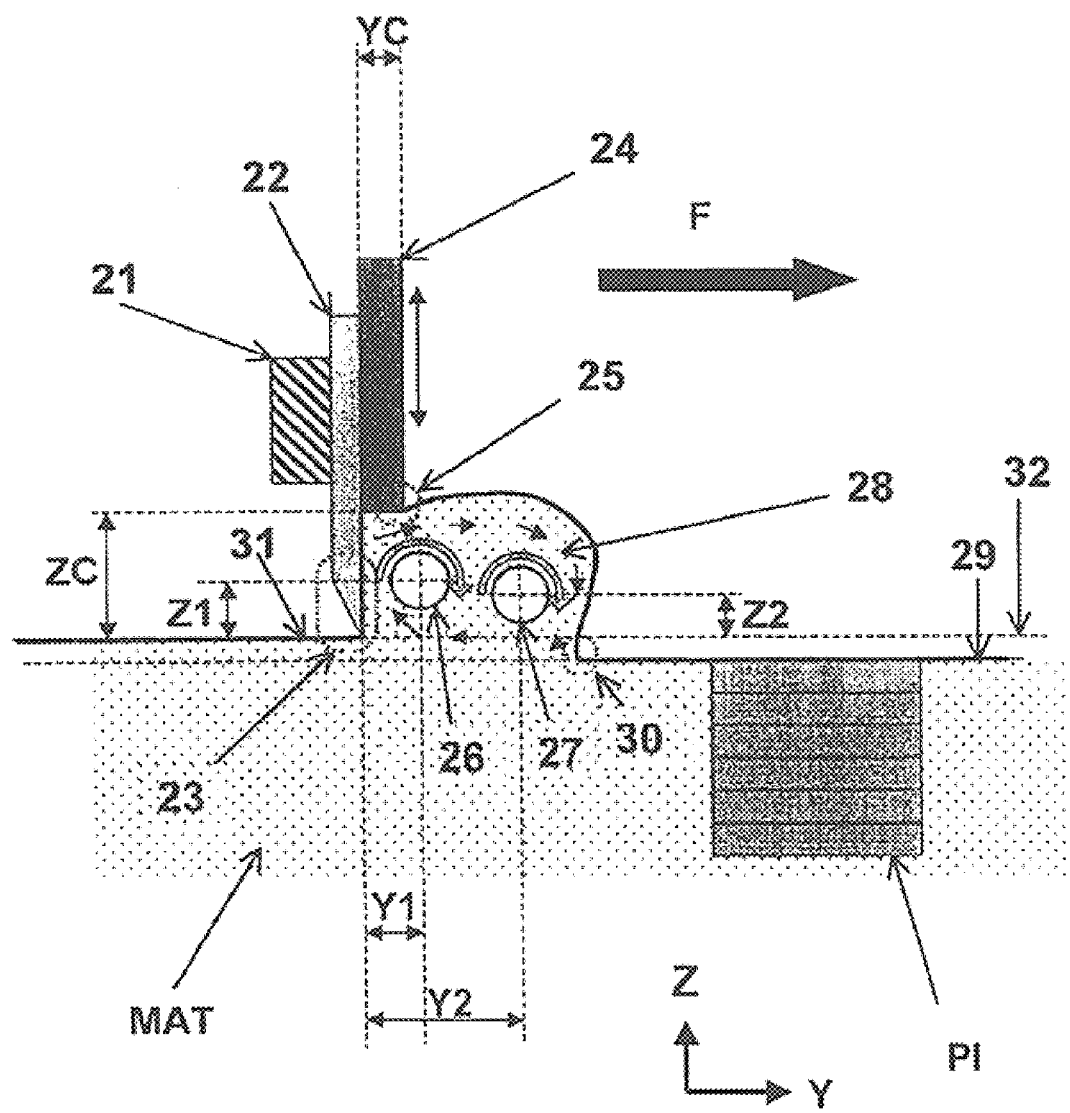
FIG. 2 shows a partial longitudinal cross-section of the preferred embodiment of a recoater blade for the implementation of the invention.

FIG. 2 shows a cross-section of a preferred embodiment of a recoater blade in accordance with the invention. The pusher is comprised of two parts (22, 24) with a constant cross-section, linked to a chassis 21. The chassis is linked, directly or otherwise to the control and drive mechanisms (not depicted). The part 22 has a tapered shape in its lower portion 23. Part 24 may be moved vertically (Z-axis), and has an angular portion 25 in its lower part comprising a protuberance with respect to the side of part 22 in contact with the raw material 28, such that the height at which said protuberance is located is easily adjustable in order to allow for adaptation to different types of materials. Two rollers, 26 and 27, comprised of cylinders laid out in parallel to the pusher, are linked to the chassis 21 by brackets (not depicted) and each one is also linked to a drive mechanism (not depicted) so they may be rotated in the "rolling direction." The recoater blade assembly thus comprised is moved along the Y-axis (in the direction indicated by the arrow F), driving a volume of material 28, which, due to the rotation movement of the rollers, comes to form a type of log with a virtually constant cross-section along its axis, rolling on itself along a rotational axis parallel to the recoater blade (this rotation of the driven material is indicated by the small arrows inside volume 28), in accordance with the technique embodied by the invention, and rolling on the free surface of the previously deposited material (represented by plane 29). Near area 30, a portion of the transported volume of material is placed on the surface 29 (downsrneam feeding), this deposit being leveled off by the lower edge of the pusher, near area 31, to create, upstream, a new free surface of material, coinciding with the height of working field 32. The essential adjustment parameters of this device are the following: D1 and D2, the respective diameters of cylinders 26 and 27; A1 and A2, the respective angular speed of rotation of cylinders 26 and 27; (Z1 and Y1) and (Z2 and Y2), the coordinates of the respective axes of parts 26 and 27 with respect to the point of contact between the surface 32 and the lower part of the part 22; ZC and YC, the dimension of the cavity formed by the assembly of parts 23 and 24 (ZC being easily adjustable by moving the part 24), and finally VY, the speed of the assembly's movement.

In the preferred embodiment of the invention, the values selected are the following: D1 and D2, between 2 and 20 mm; A1 and A2 between 10 and 1500 turns/minute; Z1 (and respectively, Z2), between 0.5 and 4 times D1 (and respectively, D2); Y1 (and respectively, Y2), between 0.5 and 6 times D1 (and respectively, D2), YC, between 0.5 and 10 millimeters; ZC, between 2 and 20 millimeters, and VY, between 1 and 200 millimeters/second.

If the distance ZC is significantly greater than the distance Z1 or Z2, the material located in area 23 risks being sucked upward, which could lead to a detachment of the material, or even a lack of material at the level of area 23. On the other hand, the closer the distance ZC is to the distance Z1 or Z2, the more part 24 will compress the material downward into area 23. A good compromise would consist in providing a distance ZC roughly equal to two times distance Z1 in order to balance the upward force of the material caused by roller 26, with the compressing force of the material from protuberance 24.

In addition, it is beneficial to provide the angular portion 25 with a lap-back point, in order to avoid the uprooting of the material along part 24 leading to a detachment of the material with respect to the pusher and the roller.

Figure 3:
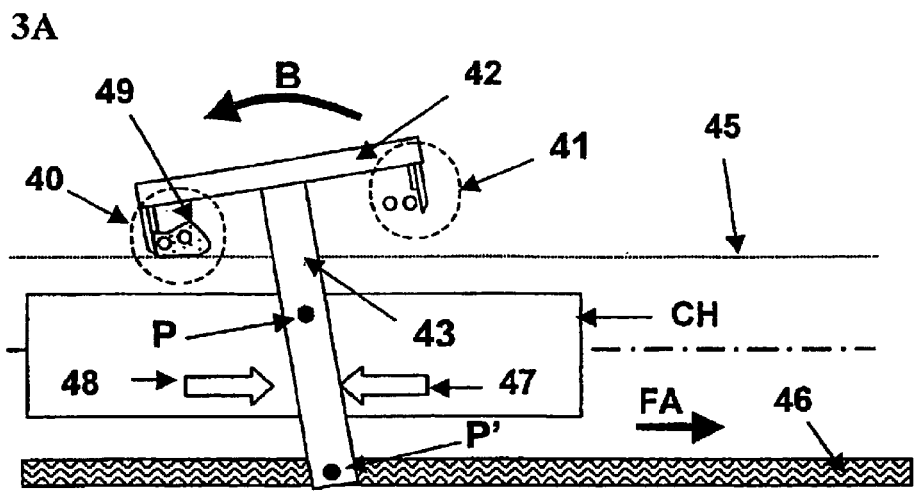
FIG. 3 shows three side views of an example of one specific embodiment of the coating phases in accordance with the invention, with reversal of the recoater blade's direction of movement in stage 3B in order to perform two successive coating phases in stages 3A and 3C.
Figure 3:
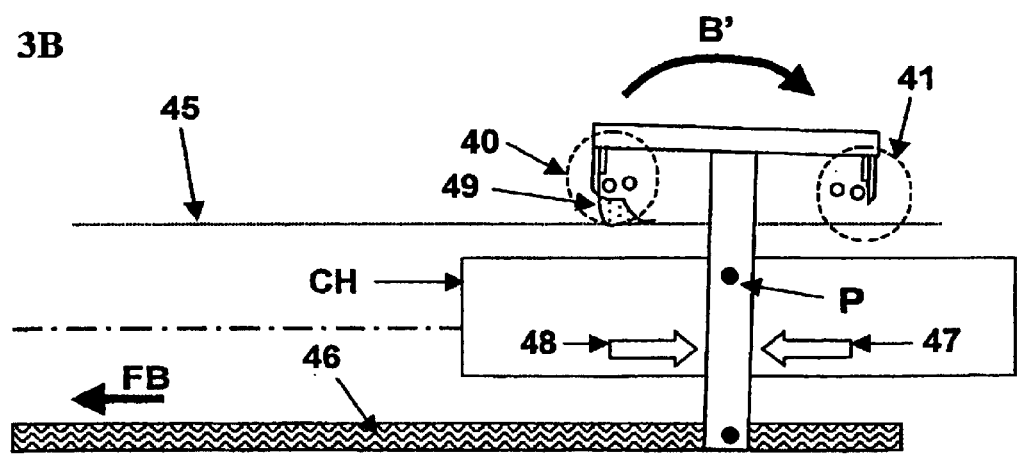
Figure 3:
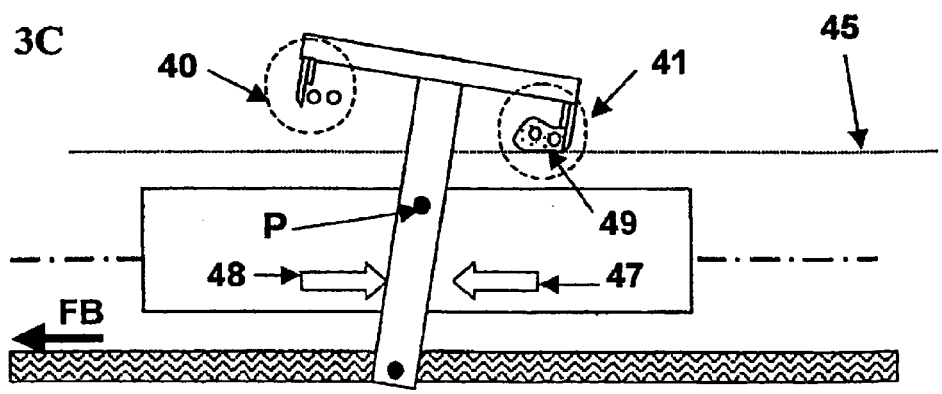

FIG. 3 shows a recoater blade comprised of the combination of two identical assemblies in a "face-to-face" configuration, allowing for the reversal of the direction of recoater blade's movement between two successive coating phases (back and forth movement). The operation of this device is drawn up in three stages (3A, 3B and 3C).

The two assemblies 40 and 41 are each comprised, in the depicted example, of a pusher and two rollers in a symmetrical configuration such that the rollers are located in the space between the two pushers.

This association is undertaken by two T-shaped parts located at the ends of the elongated assembly formed by the two recoater blades, forming a sort of frame. In the drawing's side view, only one of the ends of the frame has been depicted. The T-shaped part depicted, comprised of a "horizontal" bar 42, and a "vertical" leg 43, is linked to a carriage CH, driven in parallel to the working field represented by line 45, the link being made by means of a pivot hinge P. The lower extremity of the T is linked, in the depicted example, by a second pivot hinge P', to the drive mechanisms comprised here of a belt 46 with a portion parallel to the working field 45, said belt being driven by a drive mechanism (motor, pulley, etc., not depicted). Two adjustable stops (47, 48) located on the carriage CH, allow for the limitation of the sweeping movement of the T-shaped part. In FIG. 3A, a force directed along arrow FA is applied to the belt, provoking a sweeping of the frame in the direction indicated by arrow B. When the part 43 comes in contact with the stop 47, the frame is blocked in its pivot movement and is driven in the direction of arrow FA. The adjustment of the stop 47 allows for the height of the layer deposited by the part 40 of the recoater blade to coincide with the working field 45. The log of material 49 has been depicted near the portion 40 of the recoater blade; this volume of material is transported in the direction FA in order to perform the coating. In FIG. 3B, the force applied to the belt is reversed (direction FB), which translates into a sweeping of the frame in the direction B'. During this sweeping, the log of material 49 remains in contact with the working field 45, and leaves contact with the part 40 of the recoater blade which is lifted with respect to the surface 45 at the time of the sweeping. In FIG. 3C, the sweeping movement initiated in FIG. 3B is completed and the part 43 comes in contact with the stop 48. The adjustment of the stop 48 is such that the height of the layer deposited by part 41 of the recoater blade coincides with the working field plane 45, so that, at the time of the movement (in the direction of arrow FB, once the sweeping is completed), the part 41 of the recoater blade is loaded with the volume of material in order to perform a coating of the working field. It is confirmed that in the back and forth movement over the working field, the material is transferred from one recoater blade to the other (or, if we consider the assembly as a single recoater blade, from one side to the other), which allows for the potential feeding of the assembly on a single occasion to perform several successive coating phases. Thus, a single material distribution area is defined, rather than two zones (openings 7, 8) depicted in the case of FIG. 1.

The sweeping around a pivot allows for the very simple performance of an elevation of the lower portion of the pusher of the (inactive) recoater blade located downstream, in order to avoid this inactive pusher's wearing down the material in the event that the free surface of the material presents defects (meniscuses rising upward), which would lead, as indicated above, to risks of haphazard placement of material during the return of this inactive pusher (which then becomes the active pusher).

What is claimed is:

1. A method for applying a uniform layer of a viscous material in a layerwise fashion in a rapid prototyping apparatus, the method comprising the steps of:
   providing a working field for forming layers of the viscous material;
   supplying a volume of the viscous material adjacent the working field, the viscous material having a viscosity greater than about 10,000 centipoise; and
   applying at least a portion of the volume of the viscous material over the working field to form the uniform layer utilizing at least one recoater blade and at least one rotating roller, the recoater blade and roller being driven in a coating direction when applying the viscous material, the rotating roller contacting the volume of viscous material and establishing a log of viscous material circulating along a looping path about the rotating roller, the recoater blade being downstream from the roller when driven in the coating direction, the recoater blade being in communication with the log of viscous material to channel the viscous material circulating along the looping path when the recoater blade and roller are driven across the working field in the coating direction.

2. The method of claim 1 wherein the recoater blade further comprises a pusher having a proximal edge and when applying at least a portion of the material over the working field the proximal edge of the pusher coincides with the surface of the working field while maintaining contact with the log of material circulating along the looping path.

3. The method of claim 1 wherein when applying at least a portion of the material over the working field the log of material circulating along the looping path has a proximal portion adjacent the working field, and the material moving through the proximal portion of the log of material travels in a direction opposite the coating direction.

4. The method of claim 3 wherein when applying at least a portion of the material over the working field the roller is driven at a speed causing the material moving through the proximal portion of the log of material to travel at a relative speed with respect to the working field of about zero.

5. The method of claim 1 wherein the step of supplying a volume of the material adjacent the working field further comprises feeding the volume of material through an opening to protrude above and adjacent to the working field, the roller contacting the protruding material to establish the log of material prior to the step of applying at least a portion of the material over the working field.

6. The method of claim 1 wherein the viscous material does not flow when a shear stress of less than about 20 N/m$^2$ is applied.

7. The method of claim 1 wherein the step of applying the volume of material comprises using at least two rollers, the log of material circulating along the looping path about both rollers.

8. The method of claim 1 further comprising the step of:
   detaching the log of material from the roller and recoater blade after the roller and recoater blade have been driven across the working field in the coating direction.

9. The method of claim 8 wherein the step of applying the volume of material over the working field is repeated in a second coating direction, the step of applying the material being performed with at least two recoater blades and at least two rollers, at least one recoater blade and at least one roller for applying the material when driven in the first coating direction, and at least one recoater blade and at least one roller for applying the material when driven in the second coating direction.

10. The method of claim 9 wherein the step of applying the volume of material over the working field is repeated in the first and the second coating directions until the uniform layer has been established.

11. The method of claim 10 further comprising the step of:
transforming the uniform layer of material to form a layer of a three-dimensional object.

12. The method of claim 11 wherein the steps are repeated until all the layers of the three-dimensional object are formed.

13. A system for applying a uniform layer of a viscous material in a layerwise fashion in a rapid prototyping apparatus, the system comprising:
a means for providing a working field for forming layers of the viscous material;
a means for supplying a volume of the viscous material adjacent the working field, the viscous material not flowing when a shear stress of less than about $20n/m^2$ is applied;
a means for applying at least a portion of the volume of viscous material over the working field to form the uniform layer, the means for applying the viscous material comprising at least one recoater blade and at least one rotating roller to form the uniform layer when the recoater blade and roller are driven in a coating direction;
a drive mechanism for moving the recoater blade and roller in the coating direction; and
a means for rotating the roller, the roller contacting the volume of viscous material and establishing a log of viscous material circulating along a looping path about the rotating roller, the recoater blade being downstream from the roller when driven in the coating direction, the recoater blade being in communication with the log of viscous material to channel the material circulating along the looping path when the recoater blade and roller are driven across the working field in the coating direction.

14. The system of claim 13 wherein the recoater blade further comprises a pusher having a proximal edge coinciding with the surface of the working field while maintaining contact with the log of material circulating along the looping path when applying at least a portion of the volume of material over the working field.

15. The system of claim 13 wherein the log of material circulating along the looping path has a proximal portion adjacent the working field, and the means for rotating the roller causes the material moving through the proximal portion of the log of material to travel in a direction opposite the coating direction.

16. The system of claim 15 wherein the means for rotating the roller drives the roller at a speed causing the material moving through the proximal portion of the log of material to travel at a relative speed with respect to the working field of about zero.

17. The system of claim 13 wherein the means for supplying the volume of material comprises at least one opening in which the material is fed through to protrude above and adjacent to the working field, the roller contacting the protruding volume of material to establish the log of material prior to being driven in the coating direction.

18. The system of 13 wherein the viscous material has a viscosity of greater than about 10,000 centipoise.

19. The system of claim 13 wherein the means for applying the volume of material further comprises at least two rollers the log of material circulating along the looping path about both rollers.

20. The system of claim 13 further comprising a means for detaching the log of material from the roller and recoater blade after the roller and recoater blade have been driven past the working field in the coating direction.

21. The system of claim 13 wherein the means for applying the volume of material to form a uniform layer of material is driven in a first coating direction and a second coating direction, the means for applying the material further comprises at least two recoater blades and at least two rollers, at least one recoater blade and at least one roller for applying the material when driven in the first coating direction, and at least one recoater blade and at least one roller for applying the material when driven in the second coating direction.

22. The system of claim 21 further comprising a second means for supplying a volume of material adjacent the working field, the first means for supplying a volume of material in communication with the means for applying the material prior to moving the recoater blade and the roller in the first coating direction, and the second means for supplying a volume of material in communication with the means for applying the material prior to moving the recoater blade and the roller in the second coating direction.

23. The system of claim 22 further comprising:
a means for transforming the uniform layer of material to form a layer of a three-dimensional object prior to forming another uniform layer of material.

24. A rapid prototyping apparatus for forming a three-dimensional object from a viscous material in a plurality of layers, the apparatus comprising:
a means for providing a working field for forming layers of the material;
a means for supplying a volume of the material adjacent the working field;
a means for applying at least a portion of the volume of material over the working field to form a uniform layer of the material, the means for applying the material comprising at least one recoater blade and at least two rotating roller to form the uniform layer when the recoater blade and roller are driven across the working field in a coating direction;
a drive mechanism for moving the recoater blade and rollers in the coating direction;
a means for rotating the rollers, the rollers contacting the volume of material and establishing a log of material circulating along a looping path about both rotating rollers, the recoater blade being downstream from the rollers when driven in the coating direction, the recoater blade being in communication with the log of material to channel the material circulating along the looping path when the recoater and rollers are driven in the coating direction; and,
a means for transforming the uniform layer of material to form a layer of a three-dimensional object prior to forming another uniform layer of material.

25. The apparatus of claim 24 wherein the recoater blade further comprises a pusher having a proximal edge coinciding with the surface of the working field while maintaining contact with the log of material circulating along the looping path when applying at least a portion of the volume of material over the working field.

26. The apparatus of claim 24 wherein the log of material circulating along the looping path has a proximal portion adjacent the working field, and the means for rotating the roller, causes the material moving through the proximal portion of the log of material to travel in a direction opposite the coating direction.

27. The apparatus of claim 26 wherein the means for rotating the rollers drives the rollers at a speed causing the material moving through the proximal portion of the log of material to travel at a relative speed with respect to the working field of about zero.

28. The apparatus of claim 24 wherein the drive mechanism moves the recoater blade and rollers back and forth along a first coating direction and second coating direction, the uniform layer being formed by the means for applying the material when the recoater blade and the rollers travel in either the first coating direction or the second coating direction.

29. The apparatus of claim 28 further comprising:
a means for detaching the log of material from the rollers and recoater blade after the rollers and recoater blade have traveled past the working field in either the first coating direction or the second coating direction.

30. The apparatus of claim 29 wherein the at least one recoater blade and at least one roller apply the material when driven in the first coating direction, and at least one recoater blade and at least one roller apply the material when driven in the second coating direction.

31. The apparatus of claim 30 further comprising a second means for supplying a volume of material adjacent the working field, the first means for supplying a volume of material being in communication with the means for applying the material prior to moving the recoater blade and the at least one roller in the first coating direction, and the second means for supplying a volume of material being in communication with the means for applying the material prior to moving the recoater blade and the at least one roller in the second coating direction.

32. The apparatus of claim 31 wherein the recoater blade and the at least one roller for applying the material when driven in the first coating direction are inactive when means for applying the material is driven in the second coating direction, and the recoater blade and the at least one roller for applying the material when driven in the second coating direction are inactive when the means for applying the material is driven in the first coating direction.

33. The apparatus of claim 32 wherein the first and second means for supplying a volume of material each have an opening in which the volume of material is delivered, the openings being on opposed ends of the working field.

* * * * *